July 5, 1955 — R. D. JAMESON — 2,712,633
IGNITION SYSTEM TESTING DEVICES
Filed Feb. 21, 1951 — 2 Sheets-Sheet 1

INVENTOR.
RUSSEL D. JAMESON
BY Irving Achtenberg
ATTORNEY.

July 5, 1955 R. D. JAMESON 2,712,633
IGNITION SYSTEM TESTING DEVICES
Filed Feb. 21, 1951 2 Sheets-Sheet 2

INVENTOR.
RUSSEL D. JAMESON
BY
*Irving Achtenberg*
ATTORNEY.

United States Patent Office 2,712,633
Patented July 5, 1955

2,712,633
IGNITION SYSTEM TESTING DEVICES

Russel D. Jameson, Kansas City, Mo., assignor to Harold T. Fehr, Kansas City, Mo.

Application February 21, 1951, Serial No. 212,087

2 Claims. (Cl. 324—17)

This invention relates to means for testing the various elements of an ignition system and has particular relation to simplified and improved means for testing the ignition system of an internal combustion engine.

The ultimate objective of the operation of the ignition system is to ignite the vapor in the engine cylinder. This is accomplished by causing a spark of adequate heat to jump between the points of a spark plug. The various elements of the ignition system, i. e., the coil, condenser, battery, spark plugs, wiring and distributor all contribute to produce this result. If the spark is inadequate, the failure may lie in any one of the elements of the system. An object of this invention is to provide a simple, compact and improved means for determining where such failure may lie.

Since one test of the efficiency of an ignition system is the heat of the spark produced, numerous testing devices have been developed which use this heat to deflect a thermo-couple, the deflection being measured on a meter or scale. These devices are both expensive and delicate. One object of this invention is to eliminate the need for the thermo-couple and meter and to substitute a much simpler and less expensive measuring apparatus and one which is not so susceptible to failure and maladjustment.

To accomplish this object, I employ another characteristic of a spark rather than its heat, namely, the length of a gap which it will leap. It has been established that for spark gaps of under an inch, the length of the gap bears substantially a straight line ratio to the electromotive force producing the spark. Tests have been made and tables and charts have been published which provide data from which the exact ratio of spark gap length to voltage can be determined for any given length.

To employ this characteristic, I use a test spark gap in which the distance between the spark electrodes is variable and can be measured on a direct reading indicator. This test spark gap is arranged so as to be connected in series with the secondary circuit of the ignition system. A high frequency, make and break vibrator which interrupts a large number of times a second is arranged so as to be inserted in the primary circuit of the ignition system. This produces a stream of sparks at the test spark gap, which is readily apparent and visible to the human eye.

Another object of this invention is to provide an ignition testing device which can be used to assist in starting a cold, wet or flooded engine and can also serve as an auxiliary timing assembly in the event of failure of the contact points.

Another object of this invention is to provide a sturdy, compact, portable ignition testing apparatus.

Referring to the drawings which illustrate a preferred embodiment of the invention:

Figure 3:
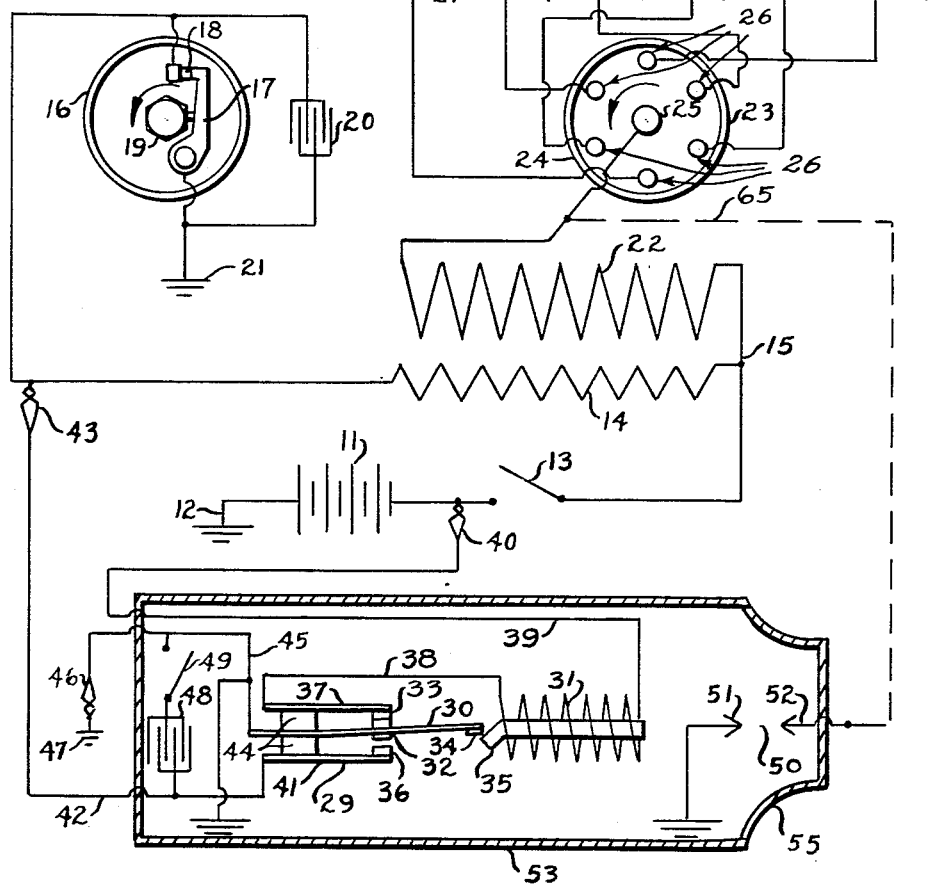
Figure 3 is a schematic electrical wiring diagram illustrating diagrammatically the instrument and wiring, and also the elements of the ignition system of an internal combustion engine.
Figure 4:
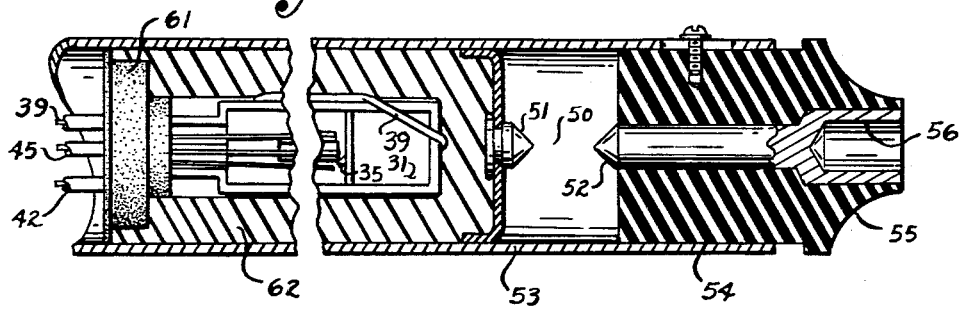
Figure 4 is a fragmentary, cross-sectional view of the apparatus along lines 4—4 of Figure 1.

Referring to Figure 3, the essential elements of the primary circuit comprise a battery 11 grounded at 12, an ignition switch 13, a primary winding 14 of a transformer coil 15, and a timing assembly 16. Timing assembly 16 comprises a breaker arm 17, contact points 18, timer cam 19, condenser 20 and ground 21. The secondary circuit includes the secondary winding 22 of transformer 15, one end of which is also grounded at 12 through switch 13, and battery 11. The other end of secondary winding 22 leads to cap 23 of distributor 24. Distributor 24 has rotor arm 25 which makes successive contact with contacts 26 which lead to spark plugs 27 which in turn are grounded at 28.

The above constitute the conventional components of the typical ignition system and comprise no part of my invention.

The apparatus embodying my invention includes a make and break vibrator 29 having a vibrating reed 30 and a magnetic coil 31. Interrupter points 32 are carried by reed 30 so as to be normally in contacting relation with contact point 33. However, when magnetic coil 31 is energized, the tip 34 of reed 30 is attracted to iron core 35 of coil 31, breaking the contact between points 32 and 33 and bringing contact point 32 into contacting relation with contact point 36.

Contact point 33 is carried by arm 37 which connects with magnetic coil 31 through lead 38. The other end of coil 31 connects through lead 39 with alligator clip 40. Contact point 36 is carried by arm 41 which connects through lead 42 with alligator clip 43. Arms 37 and 41 are separated from reed 30 by insulation 44. Reed 30 is grounded through lead 45 and alligator clip 46 to ground 47.

Test condenser 48 and condenser switch 49 are inserted in the circuit between lead 42 and lead 45.

The test spark gap 50 consists of a fixed electrode 51 and a movable electrode 52. Fixed electrode 51 is grounded to cylindrical case 53. Movable electrode 52 is carried by the cylindrical neck 54 of dome-shaped member 55 and makes electrical contact with recess 56. The diameter of neck 54 is slightly less than that of case 53, so that neck 54 will fit in case 53 and slide back and forth therein. The range of movement of neck 54 is limited by pin 57 which rides in a slot 58 in case 53. Thus it will be seen that by the inward or outward movement of dome-shaped member 55 in case 53, the distance between electrodes 51 and 52 may be decreased or increased.

Figure 1:
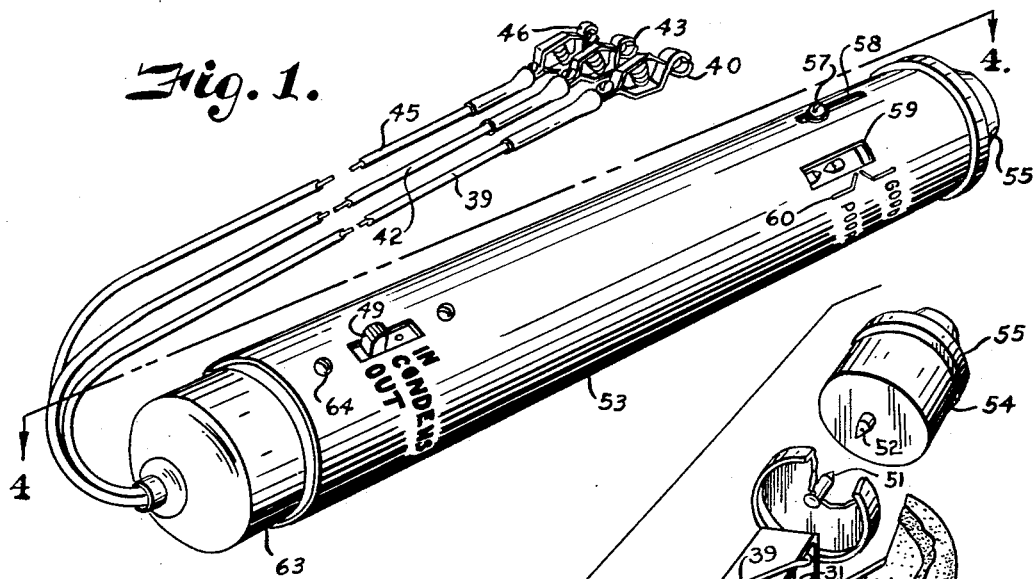
Figure 1 is a perspective view of the invention.
Figure 2:
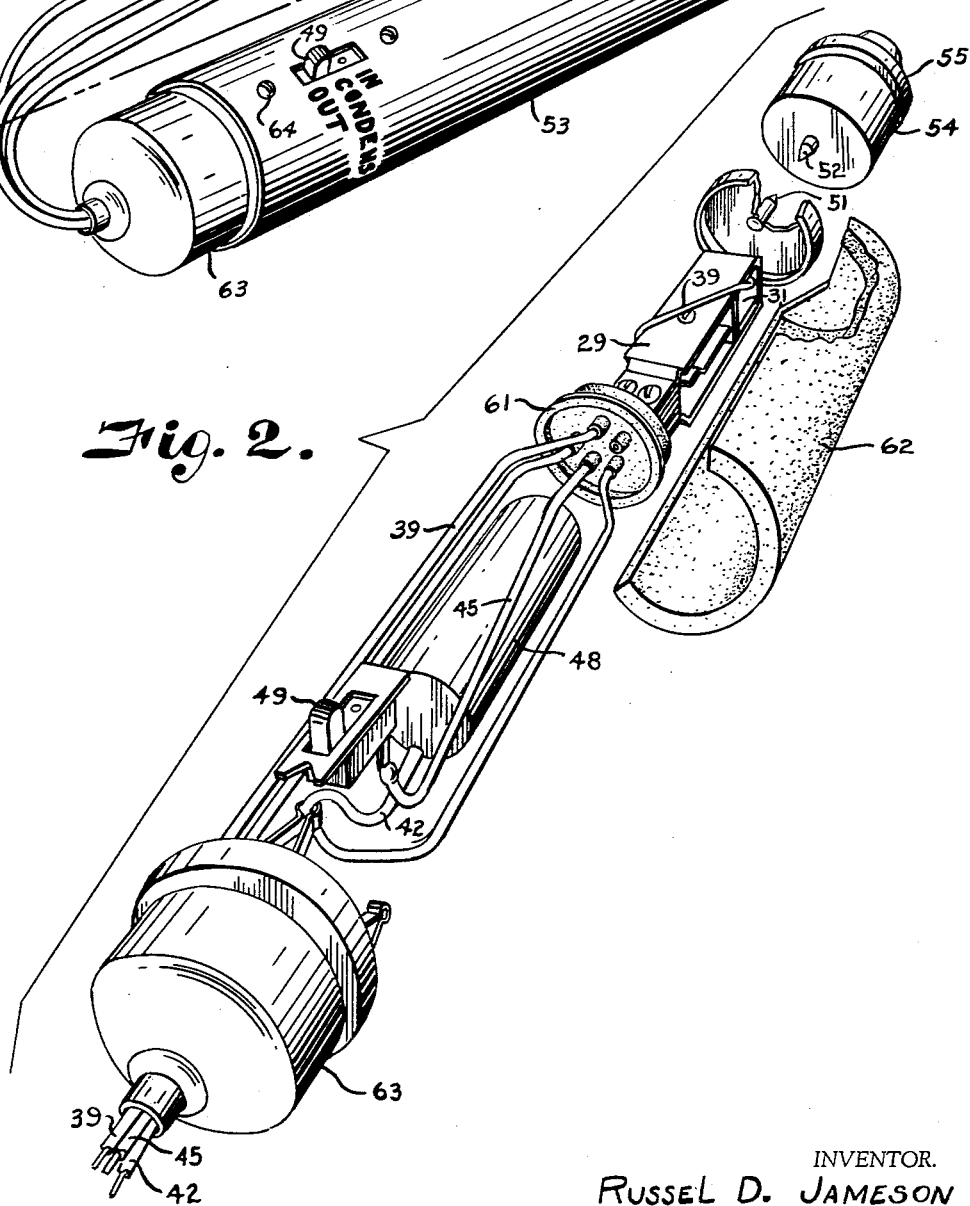
Figure 2 is an exploded view in perspective of the apparatus.

Referring to Figure 1, window or opening 59 in case 53 permits observation of test spark gap 50. Indicator 60 permits direct reading measurement of the spark efficiency. Indicator 60 may be simply calibrated to show "good" and "poor" ranges, as shown in Figure 1 or may be accurately calibrated to read kilovolts or millimeters.

Electrodes 51 and 52 are needle pointed in the preferred embodiment of my invention. Ball type electrodes may also be used within certain limits. However, greater care must be taken in their calibration because of greater deviation from the straight line ratio between spark gap measurement and kilovolts.

Rubber bushing 61 is used to hold vibrator 29 in place in case 53. Wrapping 62 serves to insulate vibrator 29 from case 53. Plug 63 is secured to case 53 by means of screw 64 and serves as a means of convenient access for disassembling the apparatus.

To place the instrument in operation, the engine is rotated slowly until the timer cam 19 opens ignition points 18. Lead 42 is then connected by hooking alligator clip 43 into the primary circuit between primary winding 14 and timing assembly 16. Lead 39 is connected to battery 11 by means of alligator clip 40. Lead 45 is connected by means of alligator clip 46 to any convenient ground 47, such as the frame of the auto.

At this point the vibrator 29 has been connected into the primary circuit. A complete circuit is produced beginning with ground 12 and through battery 11, clip 40, lead 39, magnetic coil 31, lead 38, arm 37, point 33, points 32, reed 30, lead 45, clip 46 and ground 47. The flow of current through this circuit energizes magnetic coil 31, magnetizing core 35, which thereupon attracts tip 34 of reed 30. This attraction breaks contact between points 33 and 32 and brings points 32 into contact with point 36. This interrupts the flow of current through coil 31 and demagnetizes core 35, whereupon reed 30 returns to its normal position again completing the circuit as above. As a result, a high frequency make and break action results.

Center wire 65 is now removed from distributor cap 23 and inserted in recess 56 in dome 55, thereby making electrical contact with movable electrode 52. Thus it will be seen that the test spark gap has been inserted in series in the secondary circuit, by-passing the automobile distributor and spark plugs. The secondary circuit now consists of ground 12, battery 11, switch 13, secondary winding 22, center wire 65, electrode 52, spark gap 50, electrode 51 and returns to ground through case 53.

Now ignition switch 13 is closed and there is completed a low voltage circuit through primary winding 14 beginning with ground 12, through battery 11, switch 13, and winding 14 and completed through clip 43, lead 42, arm 41, points 36 and 32, reed 30, lead 45, clip 46 and ground 47.

The action of vibrator 29 induces a high voltage in the secondary circuit causing a stream of sparks to leap between electrodes 51 and 52 which may be observed through window 59. The distance between the electrodes is then increased by moving dome 55 outward by means of pin 57, until the stream of sparks ceases to be steady and becomes intermittent.

By direct reading on the indicator 60 adjoining window 59 one can determine whether the spark is "good" or "poor." If the spark is "poor," one or more of the elements of the ignition system is faulty and other tests may be made as follows to isolate the failure.

To check the condenser, switch 49 is closed, thereby placing test condenser 48 in the primary circuit. If now the spark across test spark gap 50 is "good," the trouble lies in the condenser. If indicator 60 still shows "poor," the trouble is in coil 15.

To check for cracks or insulation breakdown in the distributor cap 23 or wiring insulation breakdown in the secondary system the instrument is connected as above except that the center wire 65 is not removed from distributor cap 23. Now test spark gap 50 is not in the secondary circuit. When the ignition switch 13 is closed a series of tiny sparks will appear where any cracks or insulation breakdown exist.

To assist in starting a cold, wet or flooded engine the instrument is connected in the same manner as used to check for insulation breakdown. When the ignition switch is closed the stream of sparks will start a cold, wet or flooded engine which would not respond to the normal spark. The same connection is used as an auxiliary timing assembly in the event of failure of contact points.

Having thus described the invention, I claim:

1. Apparatus for testing the ignition system of an internal combustion engine consisting of a tubular case, a spark gap contained in said case, means for connecting said spark gap in series with the secondary windings of the coil of said ignition system, said spark gap comprising a fixed electrode grounded to said case and a movable electrode carried by a slidable member at one end of said case, a recess in said slidable member electrically associated with said movable electrode, an opening in said case adjacent to said electrodes, a linear scale on said case adjacent to said opening, a make and break vibrator contained in said case, a lead from said vibrator, means for grounding said lead, a second lead from said vibrator, means for connecting said second lead in the primary circuit of said ignition system between the battery and the coil, a third lead from said vibrator, means for connecting said third lead in said primary circuit between the coil and the timer, a condenser contained in said case, a condenser switch mounted on the side of said case, means for connecting said condenser into said primary circuit, and a removable plug at the other end of said case, said plug containing an opening and said leads passing through said opening.

2. Apparatus for testing the ignition system of an internal combustion engine, consisting of a tubular case, a spark gap contained in said case, means for connecting said spark gap in series with the secondary windings of the coil of said ignition system, said spark gap comprising a fixed electrode grounded to said case and a movable electrode carried by a slidable member at one end of said case, a recess in said slidable member electrically associated with said movable electrode, an opening in said case adjacent to said electrodes, a linear scale on said case adjacent to said opening, a make and break vibrator, contained in said case, a lead from said vibrator, means for grounding said lead, a second lead from said vibrator, means for connecting said second lead in the primary circuit of said ignition system between the battery and the coil, a third lead from said vibrator, means for connecting said third lead in said primary circuit between the coil and the timer, a condenser contained in said case, means for switching said condenser into, and out of, said primary circuit, and a removable plug at the other end of said case, said plug containing an opening and said leads passing through said opening.

References Cited in the file of this patent

UNITED STATES PATENTS

| Number | Name | Date |
|---|---|---|
| 2,112,638 | Travis | Mar. 29, 1938 |
| 2,330,431 | Klotsch | Sept. 28, 1943 |
| 2,496,823 | Strauss | Feb. 7, 1950 |
| 2,501,802 | Walker | Mar. 28, 1950 |